US007219189B1

(12) United States Patent
Ryu et al.

(10) Patent No.: US 7,219,189 B1
(45) Date of Patent: May 15, 2007

(54) AUTOMATIC OPERATING SYSTEM HANDLE CREATION IN RESPONSE TO ACCESS CONTROL CHANGES

(75) Inventors: Sung-Wook Ryu, Mountain View, CA (US); Lisa Jianli Zhang, Milpitas, CA (US); Bruce R. Rabe, Dedham, MA (US)

(73) Assignee: Veritas Operating Corporation, Mountain View, CA (US)

( * ) Notice: Subject to any disclaimer, the term of this patent is extended or adjusted under 35 U.S.C. 154(b) by 767 days.

(21) Appl. No.: 10/160,735

(22) Filed: May 31, 2002

(51) Int. Cl.
*G06F 12/00* (2006.01)
*G06F 13/00* (2006.01)
*G06F 13/28* (2006.01)
(52) U.S. Cl. .................... 711/111; 709/223; 709/229; 711/112; 711/114; 711/152
(58) Field of Classification Search .............. 709/223, 709/229, 220; 711/112, 154, 170, 111; 714/4; 370/381; 710/305; 713/1
See application file for complete search history.

(56) References Cited

U.S. PATENT DOCUMENTS

| 6,240,511 | B1* | 5/2001 | Blumenau et al. ............. 713/1 |
| 6,343,324 | B1* | 1/2002 | Hubis et al. ................. 709/229 |
| 6,631,442 | B1* | 10/2003 | Blumenau ..................... 711/112 |
| 6,751,702 | B1* | 6/2004 | Hsieh et al. .................. 711/112 |
| 6,834,299 | B1* | 12/2004 | Hamilton et al. ........... 709/220 |
| 6,854,034 | B1* | 2/2005 | Kitamura et al. ........... 711/112 |
| 6,880,058 | B2* | 4/2005 | Mizuno et al. .............. 711/170 |
| 6,880,101 | B2* | 4/2005 | Golasky et al. ................. 714/4 |
| 6,895,461 | B1* | 5/2005 | Thompson ................... 710/305 |
| 6,912,627 | B2* | 6/2005 | Matsunami et al. ......... 711/154 |
| 6,977,927 | B1* | 12/2005 | Bates et al. .................. 370/381 |
| 2002/0103889 | A1* | 8/2002 | Markson et al. ............ 709/223 |
| 2002/0103913 | A1* | 8/2002 | Tawil et al. ................. 709/229 |
| 2004/0006616 | A1* | 1/2004 | Quinn et al. ................ 709/223 |

\* cited by examiner

*Primary Examiner*—Nathan J. Flynn
*Assistant Examiner*—Dustin Nguyen
(74) *Attorney, Agent, or Firm*—Campbell Stephenson Ascolese LLP

(57) ABSTRACT

A method, computer program product, and system that enable automated creation of operating system handles in response to storage access control changes. A determination is made of the storage array LUNs to which a host has access control permission. Those storage array LUNs and the array port WWN are provided to the host so that the host can efficiently create an OS handle. Each LUN is associated with a target assigned by the host. Configuration information for the host is automatically changed to include the association between the LUN and the target. The host is re-initialized using the configuration information such that an operating system handle is created for the association.

19 Claims, 6 Drawing Sheets

AUTOMATIC OPERATING SYSTEM HANDLE CREATION IN RESPONSE TO ACCESS CONTROL CHANGES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Historically in storage environments, physical interfaces from host computer systems to storage consisted of parallel Small Computer Systems Interface (SCSI) channels supporting a small number of SCSI devices. Whether a host could access a particular storage device depended upon whether a physical connection from the host to the SCSI device existed.

Today, storage area networks (SANs) including hundreds of storage devices can be used to provide storage for hosts. SAN is a term that has been adopted by the storage industry to refer to a network of multiple servers and connected storage devices. A SAN can be supported by an underlying fibre channel network using fibre channel protocol and fibre channel switches making up a SAN fabric. Alternatively, a SAN can be supported by other types of networks and protocols, such as an Internet Protocol (IP) network using Internet SCSI (iSCSI) protocol. A fibre channel network is used as an example herein, although one of skill in the art will recognize that the description can be implemented using other underlying networks and protocols.

Fibre channel is the name used to refer to the assembly of physical interconnect hardware and the fibre channel protocol. The basic connection to a fibre channel device is made by two serial cables, one carrying in-bound data and the other carrying out-bound data. Despite the name, fibre channel can run over fiber optic or twin-axial copper cable. Fibre channel includes a communications protocol that was designed to accommodate both network-related messaging (such as Internet Protocol (IP) traffic) and device-channel messaging (such as SCSI). True fibre-channel storage devices on a SAN are compatible with fibre channel protocol. Other devices on a SAN use SCSI protocol when communicating with a SCSI-to-fibre bridge.

Devices that participate in fibre channel networking have names and identities according to fibre channel protocol. Fibre channel was designed to be as adept for carrying storage protocols, such as SCSI, High-Performance Parallel Interface (HIPPI), and Intelligent Peripheral Interface (IPI), as for carrying network protocols, such as IP and Asynchronous Transfer Node (ATM). Fibre channel technology offers a variety of topologies and capabilities for interconnecting storage devices, subsystems, and server systems. These varying topologies and capabilities allow storage area networks to be designed and implemented that range from simple to complex configurations. Accompanying this flexibility, however, is the complexity of managing a very large number of devices and ensuring security of those devices by implementing access controls.

Depending on the implementation, several different components can be used to build a fibre channel storage area network. The fibre channel SAN consists of components such as storage subsystems, storage devices, and server systems that are attached to a fibre channel network using fibre channel adapters. Fibre channel networks in turn may be composed of many different types of interconnect entities, such as switches, hubs and bridges.

Different types of interconnect entities allow fibre channel networks to be built of varying scale. In smaller SAN environments, fibre channel arbitrated loop topologies employ hub and bridge products. As SANs increase in size and complexity to address flexibility and availability, fibre channel switches may be introduced. One or more fibre channel switches can be referred to as a SAN fabric.

FIG. 1 provides an example of a storage area network (SAN) environment in which the present invention operates. Host 110 serves as a host/server for an application program used by one or more clients (not shown). Host Bus Adapter (HBA) 112 is an interconnect entity between host 110 and fibre channel network 122. An HBA such as HBA 112 is typically a separate card in the host computer system.

Fibre channel switch 120 can be considered to represent the SAN fabric for the fibre channel network 122 corresponding to the SAN. At startup time, typically every host or device on a fibre channel network logs on, providing an identity and a startup address. A fibre channel switch, such as switch 120, catalogs the names of all visible devices and hosts and can direct messages between any two points in the fibre channel network 122. For example, some switches can connect up to $2^{24}$ devices in a cross-point switched configuration. The benefit of this topology is that many devices can communicate at the same time and the media can be shared. Sharing media, however, requires proper access control to ensure that an application program does not overwrite another application program's data. Redundant fabric for high-availability environments is constructed by connecting multiple switches, such as switch 120, to multiple hosts, such as host 110.

Storage array 130 is an array of multiple storage devices, of which storage device 136 is an example. Storage array 130 is connected to the fibre channel network via array port 132. The path 134 between array port 132 and storage device 136 is referred to as a logical unit having a Logical Unit Number (LUN). Having access to a path, such as path 134, or to a storage device accessible via the path, such as storage device 136, is commonly described as having access to the LUN.

Within a fibre channel network such as fibre channel network 122 of FIG. 1, fibre channel addresses correspond to World Wide Names (WWNs). A WWN is a unique identifier that is assigned to a node and/or port in a fibre channel network. In some environments, a node and its corresponding port may have the same WWN, and in other environments, two WWNs are used. In this example, HBA 112 has an HBA WWN and array port 132 has an Array Port WWN.

Within a host, such as host 110, and within a storage array, such as storage array 130, SCSI addressing is used instead of World Wide Names. A host, such as host 110, accesses input and output devices using SCSI LUNs. On a SAN, the host generates LUNs for the devices that are directly controlled by the host, but the host does not have direct or local access to LUNs generated by storage arrays. To access storage devices on a SAN, the host generates a SCSI "target" that is ultimately mapped to a LUN generated by the storage array.

On the other hand, a storage array generates LUNs for the storage devices within the storage array, but does not need access to LUNs generated by the host. When a new path to a storage device and/or a new storage device is added, a new LUN is generated and added to the storage array access control information as a portbinding definition. Portbinding establishes a connection between an array port and a storage device accessible via the array port. A portbinding definition typically includes the array port WWN, a device ID for the storage device, and a LUN for the path from the array port to the storage device.

Mapping a host SCSI target to a storage array LUN typically requires two steps. For a host, such as host 110, to have permission to write data to and/or read data from a storage device, such as storage device 136, the host must first have a SCSI target that is mapped to the array port corresponding to the storage device. The host generates these targets, which may be persistently bound to the array port to ensure that the same target is used consistently, even when the host is re-initialized.

Array ports are connected to the SAN fabric and function as SCSI targets behind which the storage devices bound to the array ports are visible. Once the mapping from the target to the array port is made, all storage devices accessible via the array port have the same target. However, to selectively map a host to some, but not all, of the storage devices accessible via the array port, each LUN associated with the array port should be mapped to the target as well. The LUNs generated by the storage array must be "discovered" and provided to the host to perform this mapping to the target.

Discovering and providing the LUNs generated by the storage array to the host has heretofore been performed manually. To enable a host to access a storage device, typically numerous configuration files and/or access control files must be adjusted to enable access of the storage device across the underlying network and within the storage array. These numerous changes to configuration files and access control files are tedious and time-consuming. In a SAN having a large number of devices provided by different vendors, making a seemingly simple change to the SAN access control can be very complicated. Typically, the administrator obtains SCSI addressing information using a different API or GUIs for each vendor and provides that SCSI addressing information to other components of the SAN using those components' own native APIs or GUI. These APIs and GUIs are usually vendor-specific and incompatible with each other. Often these changes cannot be made from a single computer system, such that the administrator manually writes down the addressing information and enters the data on another computer system.

Typically, mappings from SCSI targets to LUNs are contained in configuration information used for initializing a host upon booting the host computer system or issuing an initialize command. For example, this configuration information is included in an sd.conf file on a host under the Solaris operating system. The sd.conf file is used by the Solaris operating system to generate operating system handles. For the Windows 2000 operating system, configuration information is included in an internal data structure in the kernel.

To overcome the problems with discovering LUNs described above, some operating systems attempt to assign target numbers for every possible LUN. However, this solution is not scalable because, typically, a ping is sent from the host to each possible LUN upon initialization of the host. Upon receiving a response from the ping, a target is assigned. The lack of scalability of this approach is illustrated by the example of configuration information in a Solaris sd.conf file provided in Table 1 below.

TABLE 1

Name="sd" class="scsi" target=0 lun=0
name="sd" class="scsi" target=1 lun=0
name="sd" class="scsi" target=2 lun=0
name="sd" class="scsi" target=3 lun=0
name="sd" class="scsi" target=3 lun=10
name="sd" class="scsi" target=3 lun=25
name="sd" class="scsi" target=3 lun=250
name="sd" class="scsi" target=3 lun=255

In this example, each of targets 0, 1 and 2 is mapped to a single storage device having a LUN of zero. Target 3 is mapped to five access paths having LUNs 0, 10, 25, 250 and 255. The potential for growth of the configuration information is readily apparent. In a relatively small SAN with 50 ports and each port supporting 256 LUNs, 12,800 mappings from target to LUNs are possible. If a ping of each possible LUN requires one second, at least 12,800 seconds (3.55 hours) are required to initialize the host. As a result, it is desirable to limit the number of mappings to only those in which a host has access control permission for the LUN. By limiting the number of target-to-LUN mappings, the number of pings and the size of the configuration file are also limited.

Some operating systems provide a mapping from host target to storage array LUNs automatically, as well as an operating system handle that can be used by the host to access the storage devices accessible via the paths associated with the LUNs. However, other operating systems, such as Solaris, do not provide this mapping and OS handle. In these operating systems, the discovery of storage array LUNs and the extensive manual process described above to provide storage array LUNs to the host must be performed by the administrator to enable the host to access a storage device via the array port.

What is needed is a way to automatically adjust the appropriate configuration files when a change in a storage configuration occurs. These automatic adjustments can be used to generate an operating system handle that enables a host to perform efficiently input and/or output to a storage device via an operating system call.

SUMMARY OF THE INVENTION

The present invention relates to a method, computer program product, and system that enable automated creation of operating system handles in response to storage access control changes. A determination is made of the storage array LUNs to which a host has access control permission. Those storage array LUNs and the array port WWN are provided to the host so that the host can efficiently create an OS handle. Each LUN is associated with a target assigned by the host. Configuration information for the host is automatically changed to include the association between the LUN and the target. The host is re-initialized using the configuration information such that an operating system handle is created for the association.

In one feature of the invention, a method includes determining a storage array logical unit number (LUN) for a storage device accessible by a host. The storage array LUN is associated with a target assigned by the host to produce an association. Configuration information for the host is automatically changed to include the association between the storage array LUN and the target. The method further includes automatically causing the host to re-initialize using the configuration information such that an operating system handle is created for the association.

In one embodiment, the determining the storage array LUN includes identifying the host in access control information for the storage array LUN. In another embodiment, the determining the storage array LUN includes identifying the host in access control information for an array port providing access to the storage array LUN.

In another feature of the invention, a system includes an agent operable to discover at least one storage array LUN associated with a storage device accessible by a host and to associate the at least one storage array LUN with a target assigned by the host.

In another feature of the invention, a computer program product includes determining instructions to determine a storage array logical unit number (LUN) for a storage device accessible by the host, associating instructions to associate the storage array LUN with a target assigned by the host, changing instructions to automatically change configuration information for the host to include the association between the storage array LUN and the target, causing instructions to automatically cause the host to re-initialize using the configuration information such that an operating system handle is created for the association, and a computer-readable medium to store the determining instructions, the associating instructions, the changing instructions, and the causing instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
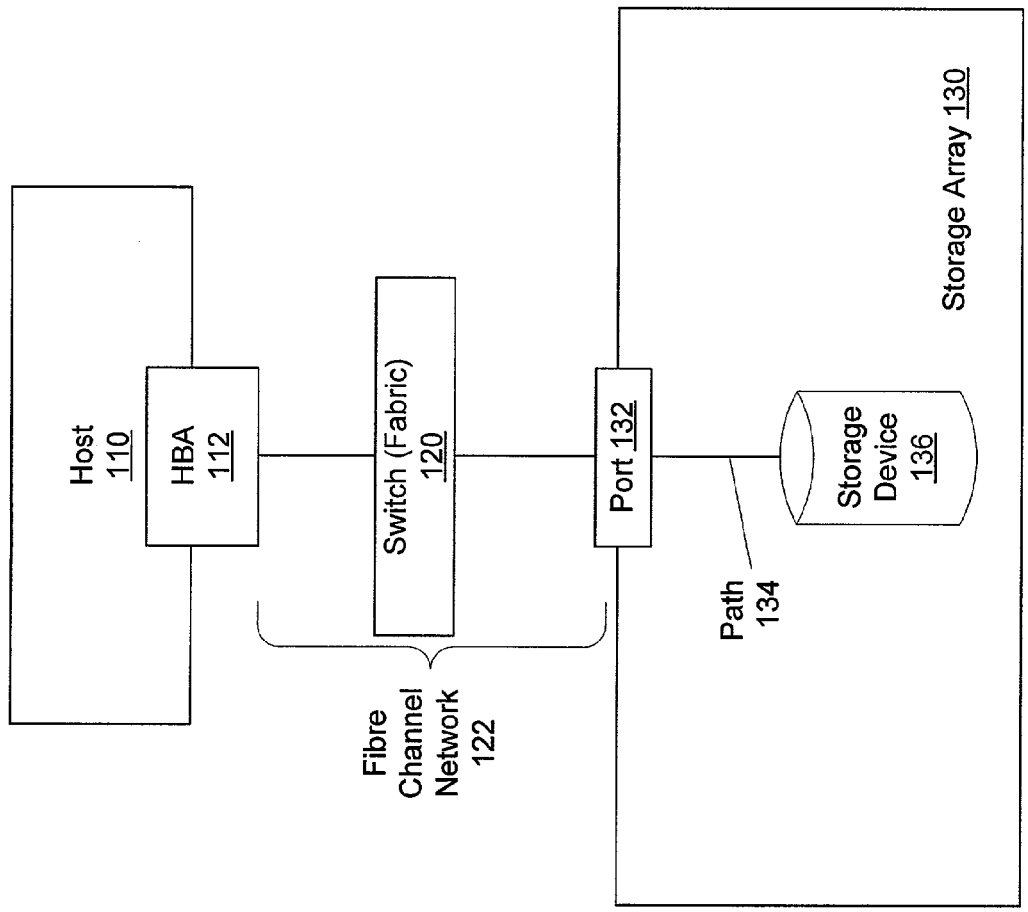
FIG. 1 provides an example of a storage area network (SAN) environment in which the present invention operates, as described above.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

In a storage area network, often hosts are allowed to access only those storage devices to which they are granted access. For example, a host acting as a database server may be assigned a set of disk volumes in which the database should be stored. Typically, unless some storage sharing software is in operation, only one host may access a particular storage device.

Various access control operations are involved in making storage array resources accessible by hosts on a SAN. A procedure called fabric zoning establishes zones of WWNs that can communicate with each other. Zoning helps to control the set of ports on the SAN that a host can access.

A more specific form of access control, called LUN access control, includes more granular control over host access to individual LUNs and associated storage devices within a storage array. Not every storage array supports access control at the LUN level. These storage arrays without LUN access control may allow a host to access every LUN supported by an array port to which the host has access.

Operations involved in LUN access control include LUN binding, LUN masking and SAN fabric zoning. Logical unit is a term used to describe the access path itself between a storage device and an array port. A LUN is assigned to the path when the path is defined. Two different LUNs can represent two different paths to a single storage device.

LUN binding refers to the creation of access paths between a storage device within a storage array, also referred to herein as an addressable unit, and a port on the storage array. Other terms used interchangeably with the term addressable unit include AddrUnit, Unit, Volume, and Logical Device. Addressable units can include storage volumes built out of the physical storage devices within the storage array. Array ports are connected to the SAN fabric and function as SCSI targets behind which the storage devices bound to those ports are visible.

LUN masking is the practice of enabling access to a particular path to a storage device, associated with a LUN, by a host on the SAN. Adding an association between a LUN and a host to access control information enables the host to access the path and associated storage device. When a LUN is made accessible by a host, an entry for the host is added to the Access Control List (ACL) for that array port and LUN. The Access Control List for a LUN can be a part of a LUN masking table, which can comprise part of a portbinding table, as described below. The Access Control List contains the WorldWide Name of host ports that have permission to use that access path—that is, to access that addressable unit through the particular array port corresponding to the LUN.

After a LUN is made accessible by a particular HBA port in a host, the zoning configuration of the SAN fabric may still prevent the host from accessing the path and storage device associated with that LUN. For the host to see the storage device and create an OS handle for the path, at least one zone on the fabric should contain both the HBA port and the array port to which the path is bound. A zoning operation may be required if the HBA port and array port are not already zoned together.

In order to provide access to a given storage device to a host, access control information such as a zoning table maintained for a SAN fabric can be updated. A LUN masking table (or LUN access control information in a portbinding table) used for managing LUNs in a storage array also can be updated. Furthermore, a persistent SCSI target for the host is preferably designated to access the storage device. As used herein, when a host is described as having access to a storage array LUN, path, or storage device, the host is assumed to have the appropriate access control permission to access the storage device, path associated with the storage device, and LUN associated with the path associated with the storage device.

The present invention enables appropriate host configuration files to be automatically adjusted when a change in storage access control occurs. These adjustments enable a host to efficiently generate an operating system handle to access a storage device via an operating system call to perform input and/or output.

Figure 2:
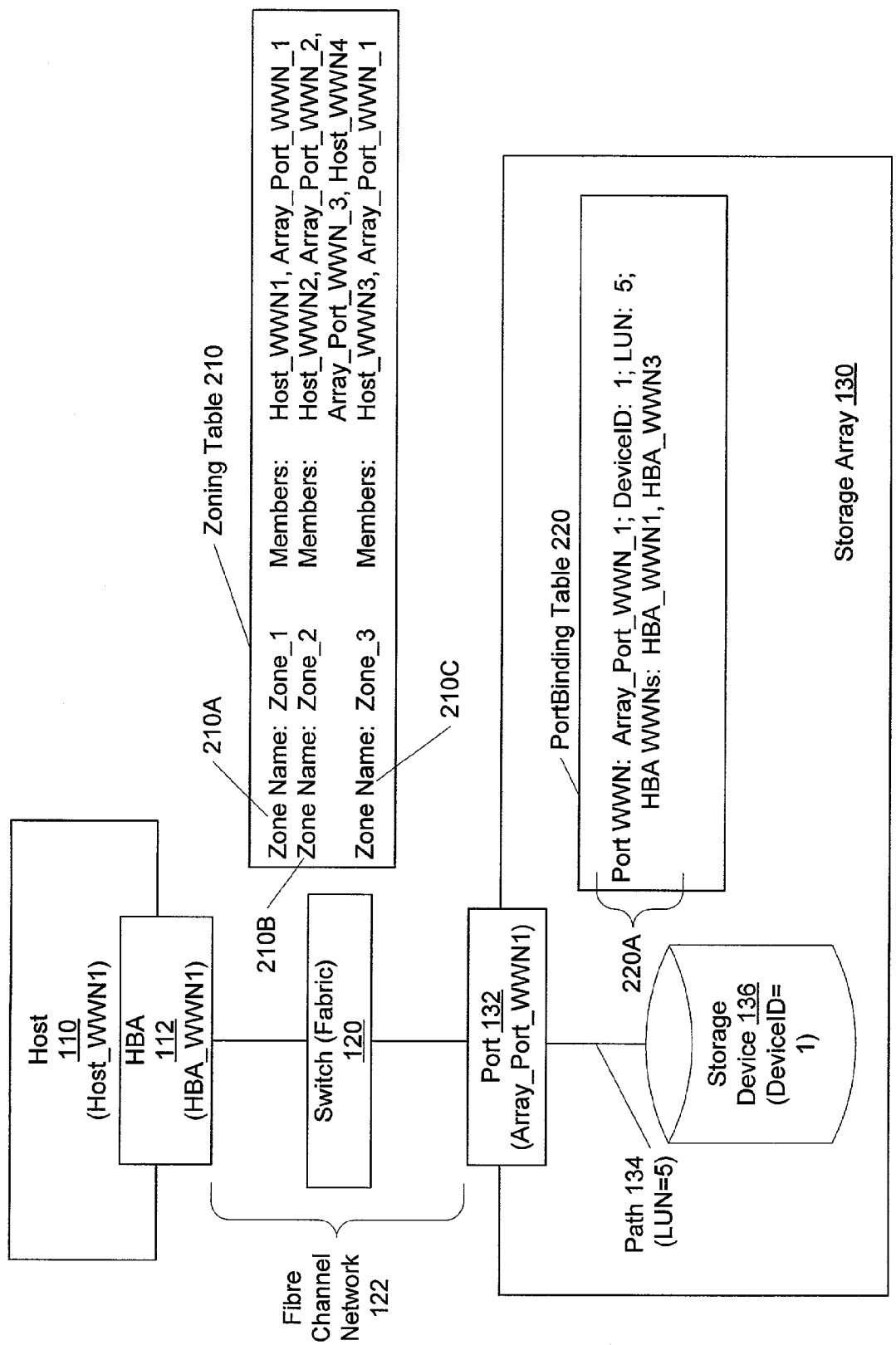
FIG. 2 shows an example of access control tables in the SAN environment of FIG. 1 that are used by the present invention.

FIG. 2 shows an example of access control information for the SAN environment of FIG. 1 that are used by the present invention. Note that the information described as in access control information may be stored in database tables, in other types of files, or as entries in various memory locations in a storage device. Also note that access by hosts to particular LUNs can be represented as part of a portbinding table; i.e., the portbinding table can be considered to include a LUN masking table mapping host WWNs to LUNs. One of skill in the art will recognize that the scope of the invention is not limited to a particular format for storing the access control information, and that alternative data fields and data structures may be used for those described herein.

Each entry of zoning table 210 includes a zone name and members of the zone, which correspond to world wide names (WWNs) for ports that can communicate with each other. Zoning table 210 includes entries 210A describing a zone named Zone_1, 210B describing a zone named Zone_2, and 210C describing a zone named Zone_3. If two WWNs do not appear in a common zone, the respective ports cannot communicate with each other.

While actual WWNs include a sequence of numbers, such as 10:00:00:00:12:89:78:30, descriptive terms are used in this example for purposes of clarity. For example, members of zone Zone_1 include Host_WWN1, corresponding to host 110, and Array_Port_WWN_1, corresponding to port 132. Members of zone Zone_2 include Host_WWN2, Array_Port_WWN_2, Array_Port_WWN_3, and Host_WWN4, none of which are shown in FIG. 2. Members of zone Zone_3 include Host_WWN3 (not shown) and Array_Port_WWN_1, corresponding to host 110.

FIG. 2 also includes Portbinding table 220 as an example of access control information controlling access to a particular LUN and associated storage device. Example entry 220A describes a portbinding and a list of host (HBA) WWNs that can access the portbinding. The portbinding of entry 220A includes a port WWN, here associated with Array_Port_WWN_1, corresponding to port 132; a DeviceID having a value of 1, corresponding to storage device 136; a LUN having a value of 5 and corresponding to path 134; and a list of host (HBA) WWNs that can access path 134 and its associated storage device 136 using the LUN having the value of 5. This list of HBA WWNs includes HBA_WWN1, corresponding to host 110, and HBA_WWN3 (not shown). The list of HBA WWNs is sometimes referred to as a LUN masking table and provides information about the hosts that can access LUNs via a given array port. Not all storage arrays support access control information at the LUN level, but rather allow access to all LUNs accessible via the associated array port.

Configuration of zoning tables is typically performed by an administrator using an API or GUI provided by the vendor for the fibre channel switch providing access to the zone. Each vendor typically has its own API or GUI, which is incompatible with those for fibre channel switches for other vendors. Often the administrator must access the storage array itself using the storage array vendor's GUI or API to obtain the storage array's array port WWN, and then enter that information into the API or GUI provided by the fibre channel switch vendor.

Similarly, configuration of LUN access control information is typically performed by an administrator using an API or GUI provided by the storage array vendor. Each vendor typically has its own API or GUI, which is incompatible with the API or GUI for storage arrays for other vendors. Often the administrator must access the fibre channel switch itself using the fibre channel switch vendor's GUI or API to obtain the HBA WWN, and then enter that information into the API or GUI provided by the storage array vendor.

Even after the access control information is configured, the host may still be unable to perform read and write operations to the storage device. Typically the host must be re-initialized and an operating system handle created for the storage device that the host can use. In an operating system which does not automatically provide such an operating system handle upon an access control change, several steps must be performed by the administrator to enable the host to directly access the storage device. These steps can be tedious and error-prone due to the nature of address formats, and may require using numerous APIs and/or GUIs, none of which are compatible.

Figure 3:
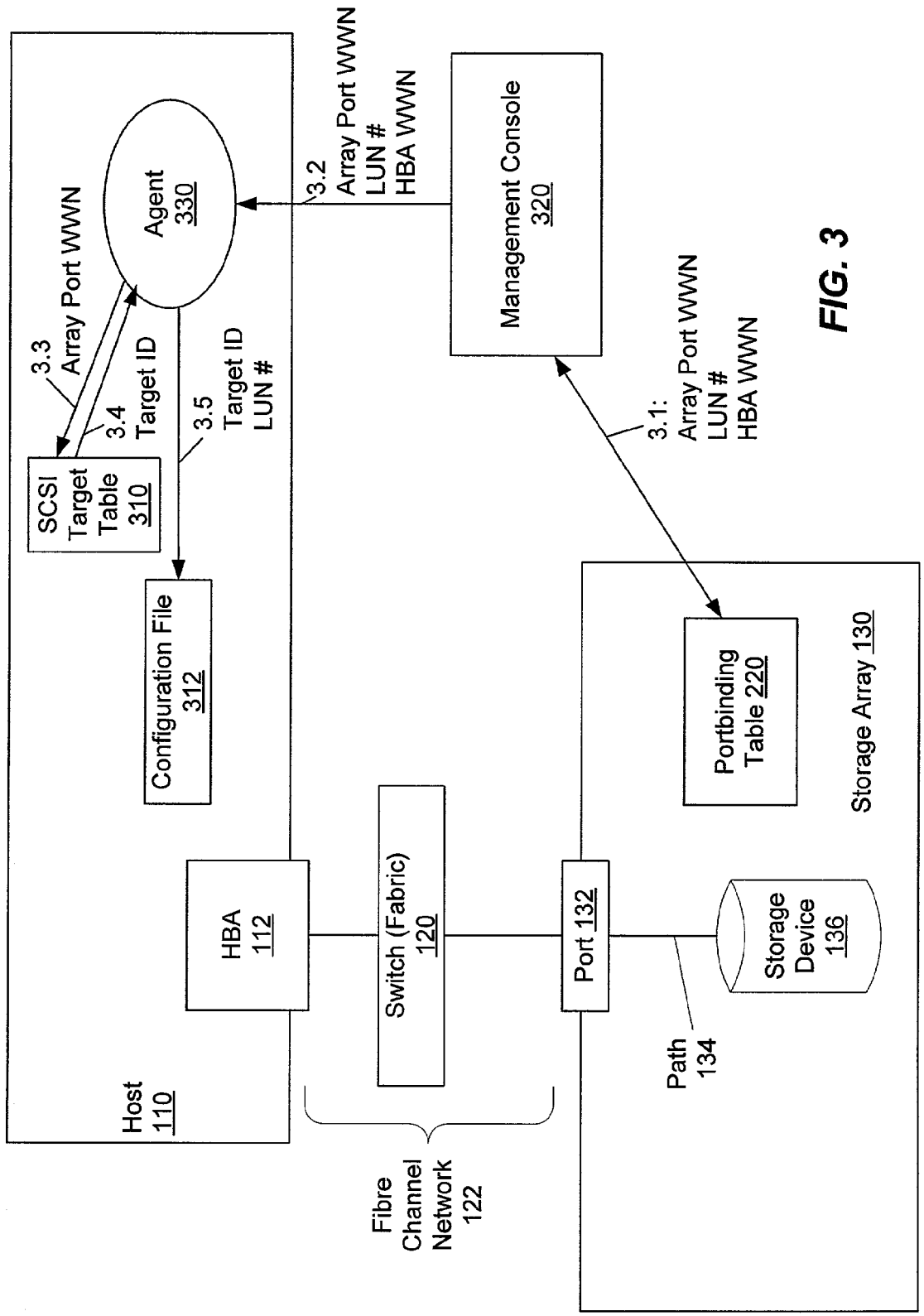
FIG. 3 shows a management console and agent operating to update a configuration file for a host in response to a change in the configuration of the SAN.

FIG. 3 shows a management console and agent operating to automatically update a host configuration file, such as an sd.conf file for a Solaris host, in response to a change in the configuration of the SAN. Assume that an administrator has made the appropriate entries in the zoning table 210 (not shown) and Portbinding table 220 to enable host 110 to access storage device 136. The actions shown in FIG. 3 automatically configure host 110 to use operating system calls to access storage device 136.

In action 3.1, management console 320 accesses Portbinding table 220 to obtain the array port WWN, LUN (corresponding to path 134), and list of HBA WWNs that may access path 134 and its associated storage device 136. In action 3.2, management console 320 determines from the HBA WWN the associated host, here host 110, to which to provide the array port WWN and LUN. Management console 320 provides the array port WWN and LUN to an agent associated with the host, here agent 330. Agent 330, which continually runs on associated host 110, obtains and uses the array port WWN to access SCSI target table 310 in action 3.3. SCSI target table 310 includes SCSI target IDs assigned by host 110 to each array port with which host 110 can communicate. Each of the LUNs accessible via a given array port can have the same target ID. SCSI target table 310 may correspond, for example, to a persistent binding table in which persistent target identifiers are associated with particular array ports. Persistent targets are used to ensure that re-initializing the host does not cause a different target identifier to be used.

In action 3.4, agent 330 obtains the SCSI target ID assigned to the array port WWN. Agent 330 can then associate the SCSI target ID with the LUN and write that information into configuration file 312 for host 110 in action 3.5. Agent 330 can then cause host 110 to re-initialize, via a reboot operation or a re-initialize command. When host 110 re-initializes, configuration information, such as configuration file 312, is read. An operating system handle is created for each entry in configuration file 312, including the newly-created entry representing the association between the SCSI target ID and the LUN.

Figure 4:
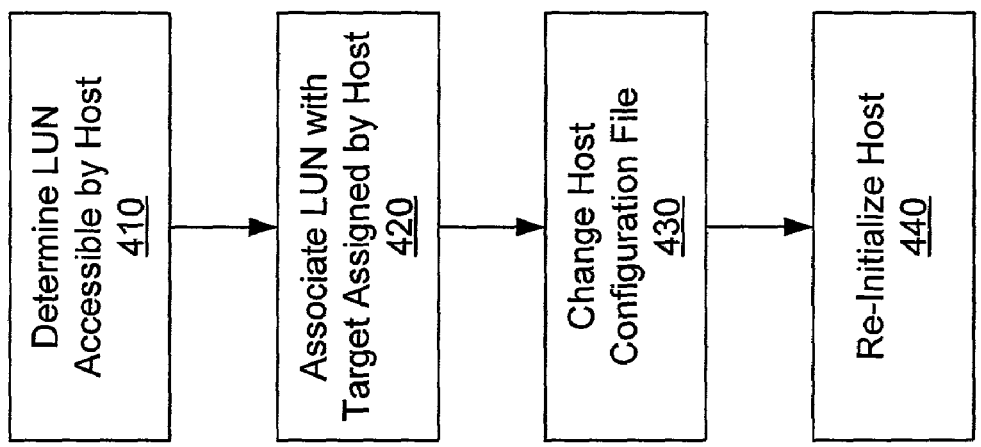
FIG. 4 is a flowchart of a method for configuring a host system in response to a change in the configuration of a SAN.

FIG. 4 is a flowchart of a method for configuring a host system in response to a change in the configuration of a SAN. Assume that a host has been granted access to a storage device and that an entry in access control information, such as Portbinding table 220, has been made. In Determine LUN Accessible by Host step 410, a LUN associated with the storage device is identified, for example, by accessing the access control information. In Associate LUN with Target Assigned by Host step 420, the LUN is associated with a persistent target assigned by the host. In Change Host Configuration File step 430, configuration information, such as an sd.conf file for a Solaris host, is updated to include an entry associating the LUN with a persistent target identifier for the host. In Re-Initialize Host step 440, the host is re-initialized, which results in the automatic creation of an operating system handle for the LUN and its associated storage device that can be used by the host.

Figure 5:
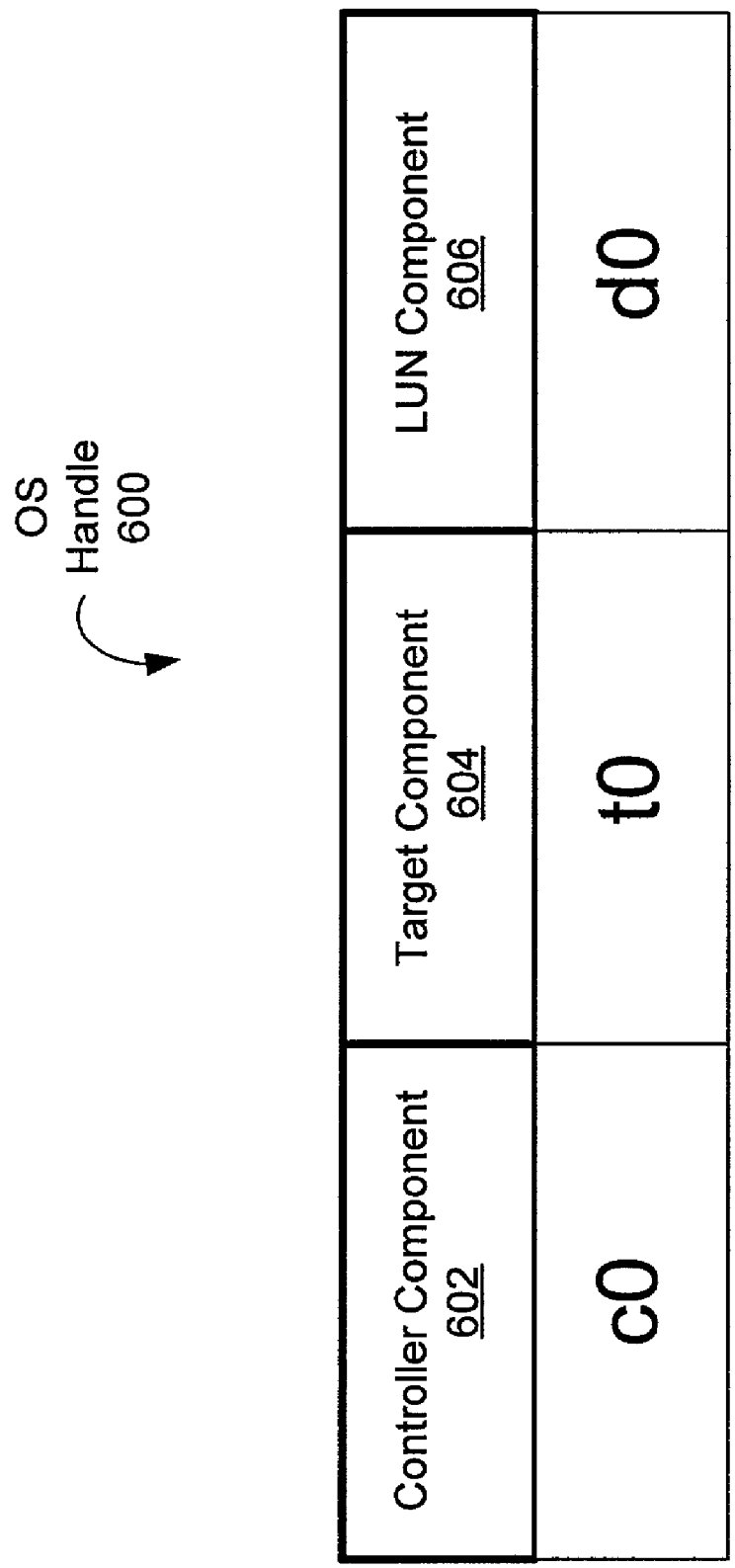
FIG. 5 shows an example of an operating system handle created as a result of the operation of the present invention.

FIG. 5 shows an example of an operating system handle 600 created as a result of the operation of the present invention. In the example shown, the operating system handle includes three components, such as a controller component 602 having a value corresponding to a host-specific port associated with the host HBA. Target component 604 corresponds to a target number associated with an array port, and LUN component 606 corresponds to a LUN associated with a storage device to which the host has access. Using this operating system handle, a host can directly access the storage device associated with the LUN.

SYSTEM SUITABLE FOR IMPLEMENTING
THE PRESENT INVENTION

Figure 6:
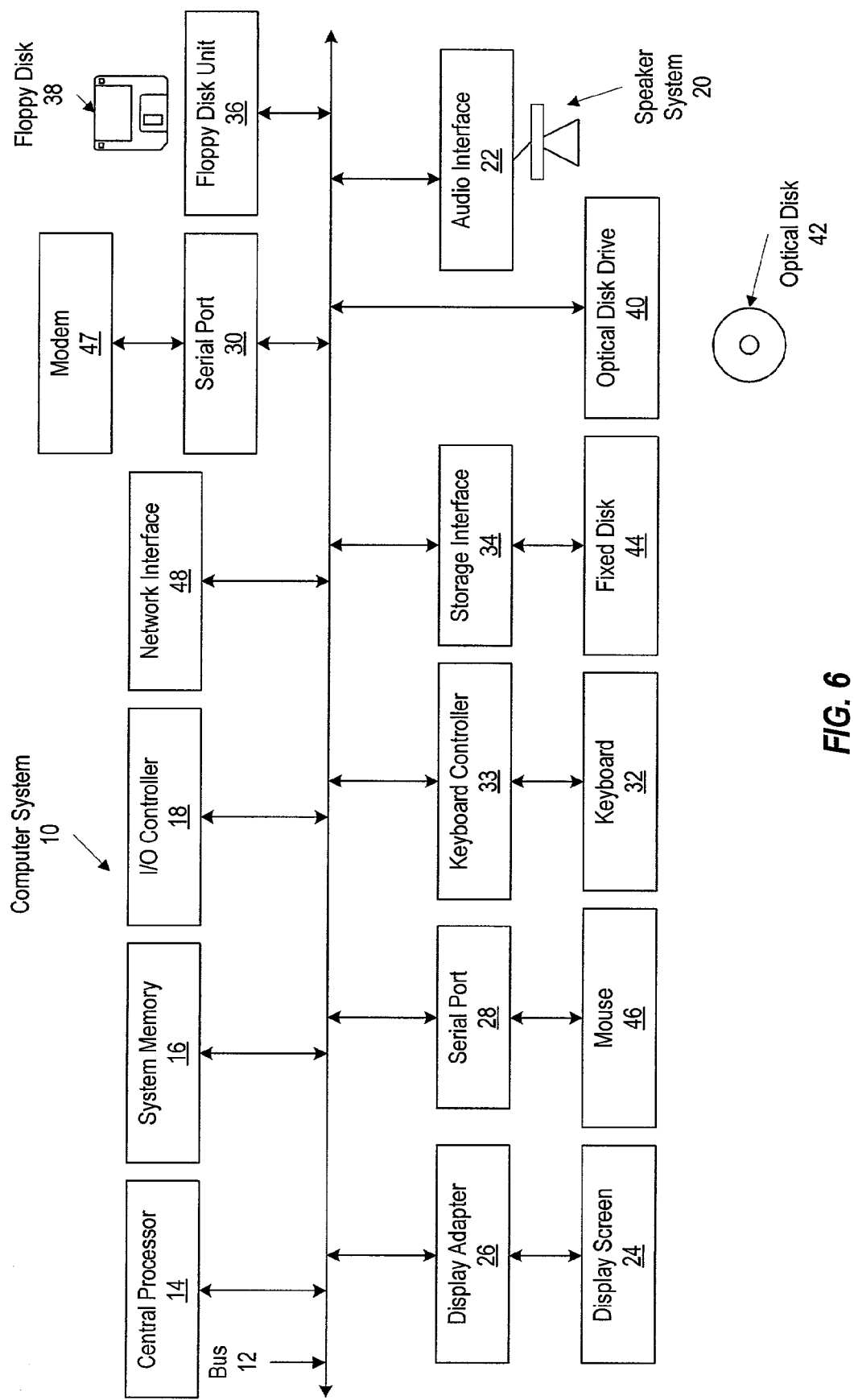
FIG. 6 shows an example of a computer system suitable for implementing the present invention.

FIG. 6 depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliances, X-window terminals or other such computing devices. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components, such as agent 330 running on host 110. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated also can be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:
1. A method comprising:
receiving a storage array logical unit number (LUN) and an array port worldwide number (WWN) for a storage device accessible by a host;
determining whether a target has been assigned for the array port WWN;
causing the target to be assigned when it is determined that no target has been assigned;
associating the storage array LUN with a target assigned by the host, the associating producing an association;
automatically changing configuration information for the host to include the association between the LUN and the target; and
automatically causing the host to re-initialize using the configuration information such that an operating system handle is created for the association.
2. The method of claim 1 further comprising:
identifying the host in access control information for the storage array LUN.

3. The method of claim 2 wherein
the access control information identifying the host comprises an HBA WWN associated with an HBA of the host.

4. The method of claim 1 further comprising:
identifying the host in access control information for an array port providing access to the LUN.

5. The method of claim 1 wherein
the associating the storage array LUN with the target comprises using the array port WWN and an HBA WWN associated with the host to identify the target.

6. The method of claim 1 wherein
the receiving, the determining, the associating, the changing, and the causing are performed in response to changing access control information in a storage area network comprising the storage device.

7. The method of claim 1 further comprising:
adding a WWN associated with the host to a LUN masking table for the storage array LUN.

8. The method of claim 1 further comprising:
adding a WWN associated with the host to a zone comprising an array port WWN for accessing the storage array LUN.

9. The method of claim 1 further comprising:
binding a path to an array port, the path corresponding to the storage array LUN.

10. The method of claim 1 wherein
the operating system handle is used by the host to provide input to and receive output from the storage device associated with the storage array LUN.

11. A storage system comprising:
an agent operable to:
receive at least one storage array LUN and an array port WWN associated with a storage device accessible by a host;
determine whether a target has been assigned for the array port WWN;
cause the target to be assigned when it is determined that no target has been assigned;
associate the at least one storage array LUN with the target assigned by the host, the associating producing an association;
automatically change configuration information for the host to include the association between the LUN and the target; and
automatically cause the host to re-initialize using the configuration information such that an operating system handle is created for the association.

12. The system of claim 11 further comprising:
an interface to update host configuration information with the storage array LUN and the target.

13. The system of claim 11 wherein
the agent is further operable to re-initialize the host to access the storage array LUN.

14. A computer storage program product comprising:
instructions for receiving a storage array logical unit number (LUN) and an array port worldwide number (WWN) for a storage device accessible by a host;
determining instructions to determining whether a target has been assigned for the array port WWN;
causing instructions to causing the target to be assigned when it is determined that no target has been assigned;
associating instructions to associating the storage array LUN with a target assigned by the host, the associating producing an association;
changing instructions to automatically change configuration information for the host to include the association between the storage array LUN and the target;
causing instructions to automatically cause the host to re-initialize using the configuration information such that an operating system handle is created for the association; and
a computer-readable medium to store the instruction for receiving, the determining instructions, the associating instructions, the changing instructions, and the causing instructions.

15. The computer program product of claim 14 further comprising:
identifying instructions to identify the host in access control information for the storage array LUN, wherein
the computer-readable medium further stores the identifying instructions.

16. The computer program product of claim 14 further comprising:
identifying instructions to identify the host in access control information for an array port providing access to the storage array LUN, wherein
the computer-readable medium further stores the identifying instructions.

17. A storage system comprising:
means for receiving a storage array logical unit number (LUN) and an array port worldwide number (WWN) for a storage device accessible by a host;
means for determining whether a target has been assigned for the array port WWN;
means for causing the target to be assigned when it is determined that no target has been assigned;
means for associating the storage array LUN with a target assigned by the host, the associating producing an association;
means for automatically changing configuration information for the host to include the association between the storage array LUN and the target; and
means for automatically causing the host to re-initialize using the configuration information such that an operating system handle is created for the association.

18. The system of claim 17 further comprising:
means for identifying the host in access control information for the storage array LUN.

19. The system of claim 17 further comprising:
means for identifying the host in access control information for an array port providing access to the storage array LUN.

* * * * *